(12) United States Patent
Sievert et al.

(10) Patent No.: US 8,803,665 B2
(45) Date of Patent: Aug. 12, 2014

(54) CONVERTIBLE WIRELESS REMOTE CONTROL

(75) Inventors: Michael Sievert, Yarrow Point, WA (US); Robert D. Dickinson, III, Woodinville, WA (US); Blake C. Ramsdell, Sammamish, WA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 853 days.

(21) Appl. No.: 12/751,933

(22) Filed: Mar. 31, 2010

(65) Prior Publication Data

US 2010/0188249 A1 Jul. 29, 2010

Related U.S. Application Data

(63) Continuation of application No. 12/494,568, filed on Jun. 30, 2009.

(60) Provisional application No. 61/116,972, filed on Nov. 21, 2008.

(51) Int. Cl.
*G05B 11/01* (2006.01)
*H04B 10/00* (2013.01)
*H03K 17/94* (2006.01)

(52) U.S. Cl.
USPC .......... 340/12.22; 398/106; 398/114; 341/22; 341/176

(58) Field of Classification Search
None
See application file for complete search history.

(56) References Cited

U.S. PATENT DOCUMENTS

| 5,583,560 A | 12/1996 | Florin et al. |
|---|---|---|
| 6,240,555 B1 | 5/2001 | Shoff et al. |
| 6,327,459 B2 | 12/2001 | Redford et al. |
| 6,650,867 B2 | 11/2003 | Redford et al. |
| 7,123,242 B1 | 10/2006 | Henty |
| 7,421,376 B1 | 9/2008 | Caruso et al. |
| 7,516,074 B2 | 4/2009 | Bilobrov |
| 2005/0078087 A1 | 4/2005 | Gates et al. |
| 2007/0030251 A1 | 2/2007 | Henty |
| 2007/0142101 A1 | 6/2007 | Seshagiri et al. |
| 2007/0180461 A1 | 8/2007 | Hilton |
| 2008/0218397 A1 | 9/2008 | Zylka et al. |
| 2008/0239168 A1 | 10/2008 | Henty |
| 2008/0246890 A1* | 10/2008 | Henty ........................... 348/734 |

(Continued)

FOREIGN PATENT DOCUMENTS

| CN | 2705962 A | 6/2005 |
|---|---|---|
| CN | 201075199 Y | 6/2008 |

(Continued)

OTHER PUBLICATIONS

Website, 3 pages, available at http://en.wikipedia.org/wiki/Digital_video_fingerprinting, as of Jan. 21, 2011.

(Continued)

*Primary Examiner* — Travis Hunnings
*Assistant Examiner* — Omeed Alizada
(74) *Attorney, Agent, or Firm* — Ference & Associates LLC

(57) ABSTRACT

Embodiments include a convertible wireless remote control suitable for controlling a computer of a media management system offering an integrated multimedia experience. Embodiments control the media management system wirelessly with a small amount of buttons but are convertible to offer expanded and/or changed functionality to the user, as desired.

5 Claims, 8 Drawing Sheets

(56) References Cited

U.S. PATENT DOCUMENTS

| | | |
|---|---|---|
| 2008/0311963 A1 | 12/2008 | Strawn |
| 2009/0002218 A1 | 1/2009 | Rigazio et al. |
| 2010/0127884 A1 | 5/2010 | Sievert et al. |
| 2011/0128228 A1 | 6/2011 | Van der Byl |
| 2011/0151935 A1 | 6/2011 | Oksman et al. |
| 2011/0248933 A1 | 10/2011 | Griffin et al. |
| 2012/0119873 A1 | 5/2012 | Ramsdell et al. |

FOREIGN PATENT DOCUMENTS

| | | |
|---|---|---|
| CN | 101432979 A | 5/2009 |
| CN | 101510973 A | 8/2009 |
| EP | 1023807 | 7/2002 |
| JP | 2004120248 A | 4/2004 |

OTHER PUBLICATIONS

Website, 1 page, available at http://www.digitalsmiths.com, as of Feb. 4, 2011.
Alizada, Omeed, Examiner's Answer in U.S. Appl. No. 12/494,568, USPTO (Jan. 11, 2013) (7 pages).
Alizada, Omeed, Final Office Action in U.S. Appl. No. 12/494,568, USPTO (Jun. 20, 2012) (19 pages).
Alizada, Omeed, Office Action in U.S. Appl. No. 12/494,568, USPTO (Dec. 30, 2011) (19 pages).
Sievert, Michael, Amendment in Response to Non-Final Office Action in U.S. Appl. No. 12/494,568, (Mar. 30, 2012) (11 pages).
Sievert, Michael, Appeal Brief in U.S. Appl. No. 12/494,568 (Nov. 20, 2012) (20 pages).
Syed, Nabil, Office Action in U.S. Appl. No. 12/944,837, USPTO (Oct. 18, 2012) (8 pages).
Ramsdell, Blake Charles, Amendment in Response to Non-Final Office Action in U.S. Appl. No. 12/944,837, (Jan. 18, 2013) (8 pages).
Syed, Nabil, Final Office Action in U.S. Appl. No. 12/944,837, USPTO (Apr. 22, 2013) (11 pages).
Ramsdell, Blake Charles, Amendment in Response to Final Office Action in U.S. Appl. No. 12/944,837, (Jul. 22, 2013) (9 pages).
Syed, Nabil, Office Action in U.S. Appl. No. 12/944,837, USPTO (Oct. 1, 2013) (10 pages).
Ramsdell, Blake Charles, Amendment in Response to Office Action in U.S. Appl. No. 12/944,837, (Dec. 23, 2013) (10 pages).
Syed, Nabil, Office Action in U.S. Appl. No. 12/944,837, (Apr. 3, 2014) (14 pages).
Ramsdell, Blake Charles, Amendment in Response to Final Office Action in U.S. Appl. No. 12/944,837 (Jun. 3, 2013), 13 pages.
Syed, Nabil, Advisory Action in U.S. Appl. No. 12/944,837 (Jun. 12, 2014), 3 pages.
Ramsdell, Blake Charles, Amendment in Response to Final Office Action in U.S. Appl. No. 12/944,837 (Jun. 3, 2014), 13 pages.

* cited by examiner

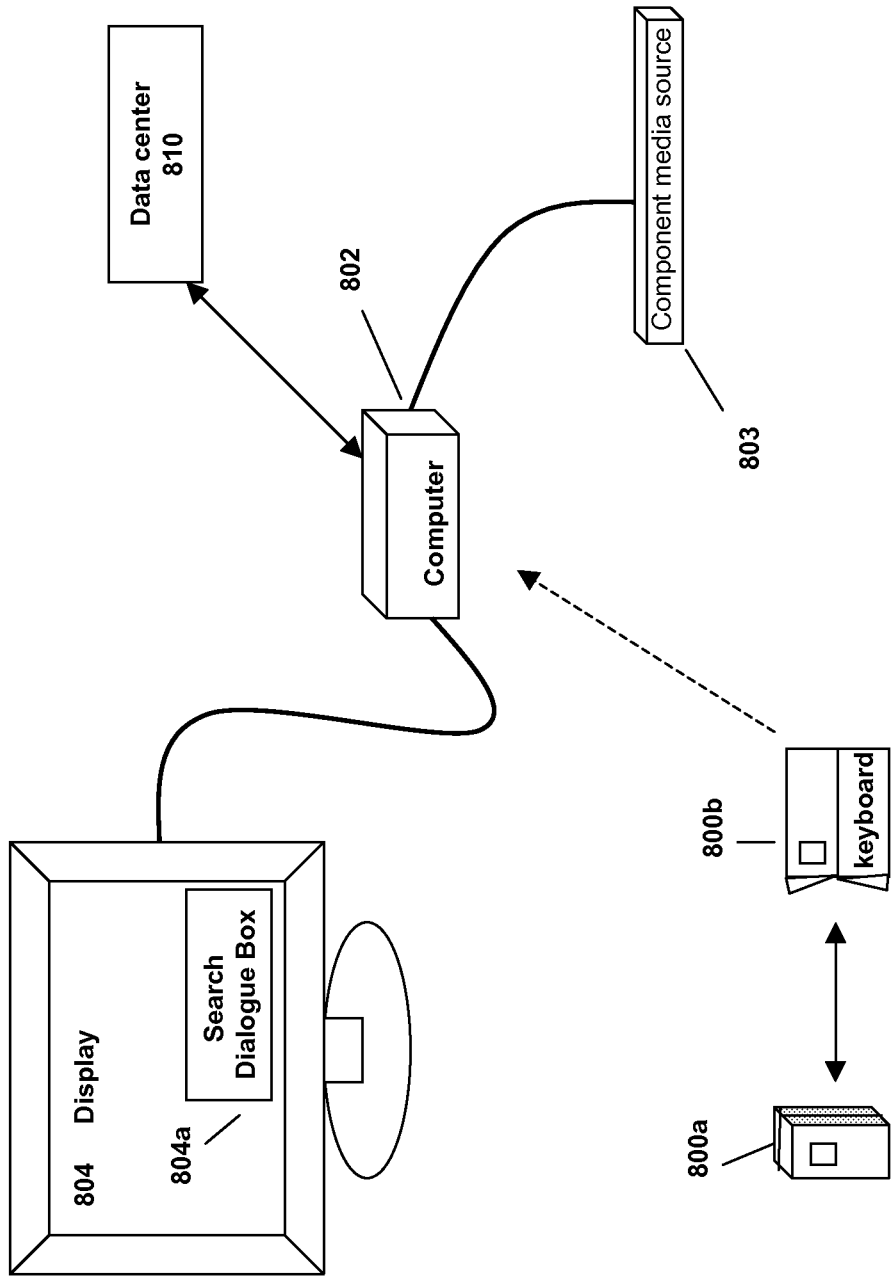

CONVERTIBLE WIRELESS REMOTE CONTROL

CROSS REFERENCE TO RELATED APPLICATIONS

This application is a continuation application of U.S. patent application Ser. No. 12/494,568, filed Jun. 30, 2009, which claims priority to U.S. Provisional Patent Application No. 61/116,972, filed Nov. 21, 2008, each of which is fully incorporated by reference herein.

BACKGROUND

The subject matter presented herein is directed to devices for control of a multimedia management system. Specifically, systems and methods providing users with a convertible wireless remote control for interfacing with a multimedia management system are described herein.

A wide variety of remote controls are conventionally available for controlling a wide variety of devices including but not limited to media devices and players (e.g. Televisions, DVD players, VCRs, stereos, etc.), and media receivers (e.g. cable TV boxes, satellite TV receivers, etc.). Even if the user has one remote control for all devices, these conventional remote controls often have a multitude of buttons and/or superfluous controls that can cause confusion for users.

In addition, consumers are increasingly accessing Internet content to supplement more traditional media experiences. Common examples include using other devices including but not limited to laptop and desktop computers, cell phones, smart phones, etc. to obtain web pages while watching a television show.

Utilization of these various devices in order to obtain a variety of desired media is less than ideal, as users must repeatedly switch between devices and applications. Moreover, users are often forced to handle multiple remote control devices to utilize multiple media sources, e.g. to watch television and surf the Internet.

Accordingly, the inventors have recognized a need for an integrated system and remote control thereof that seamlessly combines the various capabilities of conventional devices, providing a truly integrated and easily controlled multimedia experience.

BRIEF SUMMARY

In summary, one aspect provides a system comprising: an apparatus comprising: one or more processors; and a receiver; and a convertible wireless remote control configured to undergo a conformational change; wherein the receiver is configured to receive a signal from the convertible wireless remote control; wherein responsive to the conformational change, the convertible wireless remote control automatically communicates the signal; wherein, responsive to execution of computer readable program code accessible to the one or more processors, the one or more processors are configured to: in response to receiving the signal, output for display a search dialogue box.

Another aspect provides a method comprising: receiving at an electronic device a signal from a convertible wireless remote control in response to a conformational change of the convertible wireless remote control; responsive to receiving the signal, outputting a search dialogue box for display on a display device.

A further aspect provides a system comprising: an apparatus comprising: one or more processors; wherein, responsive to execution of computer readable program code accessible to the one or more processors, the one or more processors are configured to: identify a source media content input to the apparatus; automatically obtain related media content based upon the identifying; and prepare the source media content and the related media for output to a display device; the apparatus further comprising a receiver configured to receive a signal from a convertible wireless remote control; wherein in response to receiving the signal the apparatus is configured to output for display a search dialogue box.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 8 illustrates a media management system with convertible wireless remote control.

DETAILED DESCRIPTION

Figure 1:
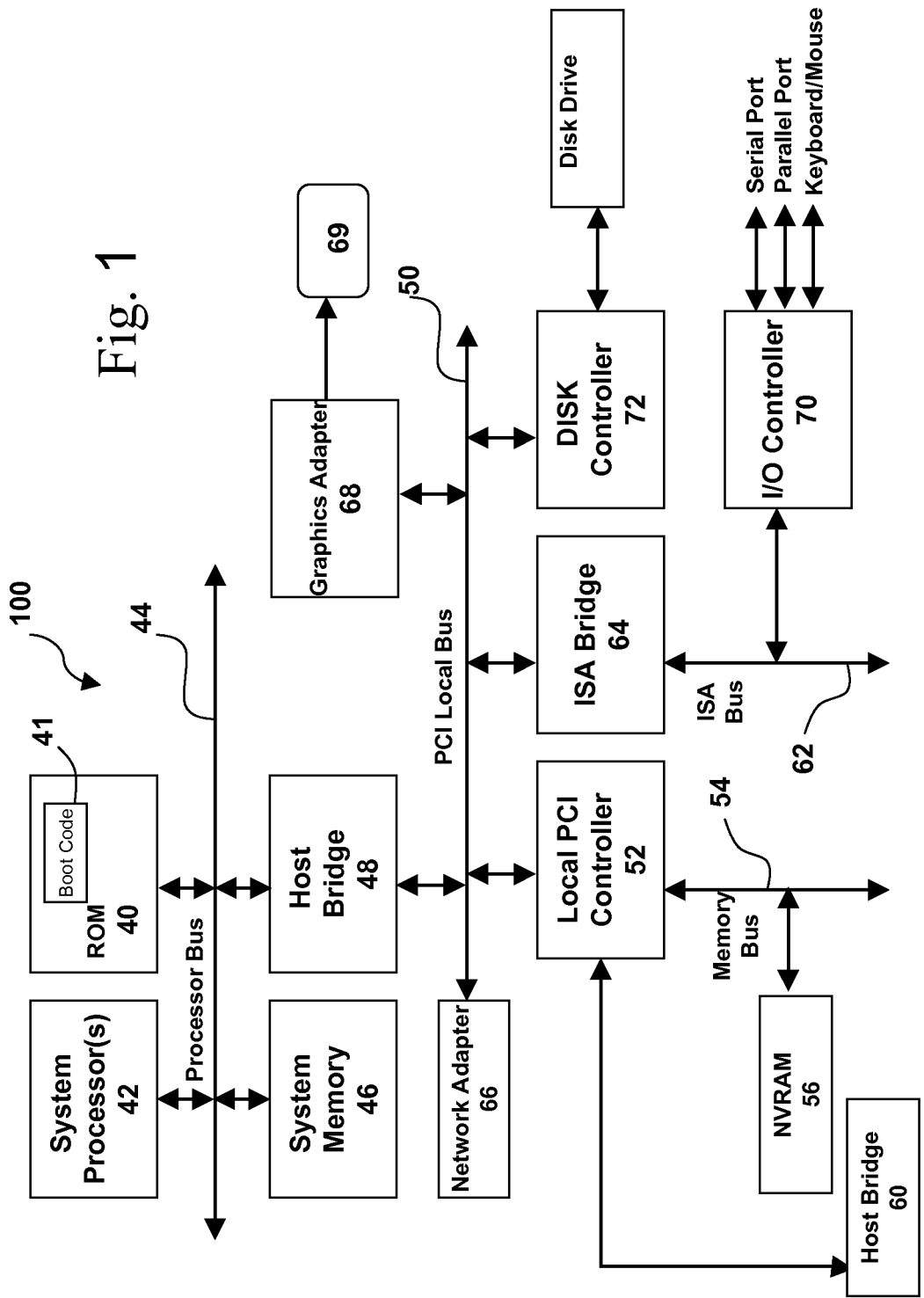
FIG. 1 illustrates a block diagram of a computer system.

It will be readily understood that the components of the embodiments, as generally described and illustrated in the figures herein, may be arranged and designed in a wide variety of different configurations in addition to the described embodiments. Thus, the following more detailed description of the embodiments, as represented in the figures, is not intended to limit the scope of the claims, but is merely representative of those embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

At least one embodiment provides a convertible wireless remote control suitable for controlling a computer of a media management system offering an integrated multimedia experience. In an embodiment, the convertible wireless remote control wirelessly controls the system with a small amount of buttons, but is convertible to offer expanded and/or changed functionality to the user, as desired. In an embodiment, the convertible wireless remote control automatically produces a signal upon a conformational change, such as opening the slider to expose the keyboard portion, which in turn causes the system to automatically display a search dialogue box on a display screen. The search dialogue box displayed on the display screen offers a user an area in which to enter text, such as text for searching for a web site.

The illustrated embodiments will be best understood by reference to the figures. The following description is intended only by way of example, and simply illustrates certain embodiments.

As noted above, conventional devices used for media management do not provide an integrated experience for the user. In contrast, systems, devices and methods for providing an integrated media experience are described in co-pending and commonly owned U.S. patent application Ser. No. 12/415,638, filed on Mar. 31, 2009, and Ser. No. 12/463,020, filed on May 8, 2009, and Ser. No. 12/494,470, filed Jun. 30, 2009, all of which are incorporated by reference herein. These applications provide some useful information on media management systems that can identify a variety of media content, obtain related content based on the identification, and integrate/overlay media content from a plurality of sources for selective, combined display.

According to one embodiment, a convertible wireless remote control is configured to control a computer of such a media management system. This convertible wireless remote control offers a wide variety of functions to the user with a simplified user interface that is convertible and thus can be expanded to provide the user an increased amount of control, as desired.

There are a variety of scenarios where remote control of a computer is useful. One of these scenarios is when a computer of a media management system is connected to a conventional display (e.g. a high definition television set (HDTV)), and the user is located in close proximity, using the media management system to view some form of combined media (e.g. a television program and related web sites). In such a television watching scenario, users would benefit from a wireless control device that is convertible, such that it allows for at least two modes of use. One mode could be, for example, a simplified mode requiring only minimal computer control (corresponding to the use context where the user is focusing on watching the television program). Another mode could be, for example, an involved mode that may require text entry and/or a refined pointing/selection method (e.g. a provided by a mouse, touch pad, trackball, joystick, etc., corresponding to the use context where the user wishes to select and view a related web site(s)).

The computer of the media management system can be controlled by a variety of remote control devices, including, according to one embodiment, a unique dual-mode convertible wireless remote control, as shown and described herein. This convertible wireless remote control can be used to control a traditional computer (e.g. a laptop or desktop computer), since the communication functions as described herein (e.g. with the computer of the media management system) can accomplish communication with computing devices via an appropriate signal (e.g. radio frequency) transmitted to an appropriate transceiver (e.g. a USB transceiver) operatively connected to the computing device. The transceiver can be located inside the system case of the computer and thus hidden or plugged into the USB port (e.g. external transceiver).

According to one embodiment, the convertible wireless remote control comprises a wireless controller design and accompanying software and hardware to enable the dual modes of use. Accordingly, it should be understood that a combination of hardware and software can be utilized to implement the functionality of the convertible wireless remote control as described herein.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As will become apparent from the following description, however, certain embodiments are applicable to operation by any appropriately configured data processing system or other electronic device.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
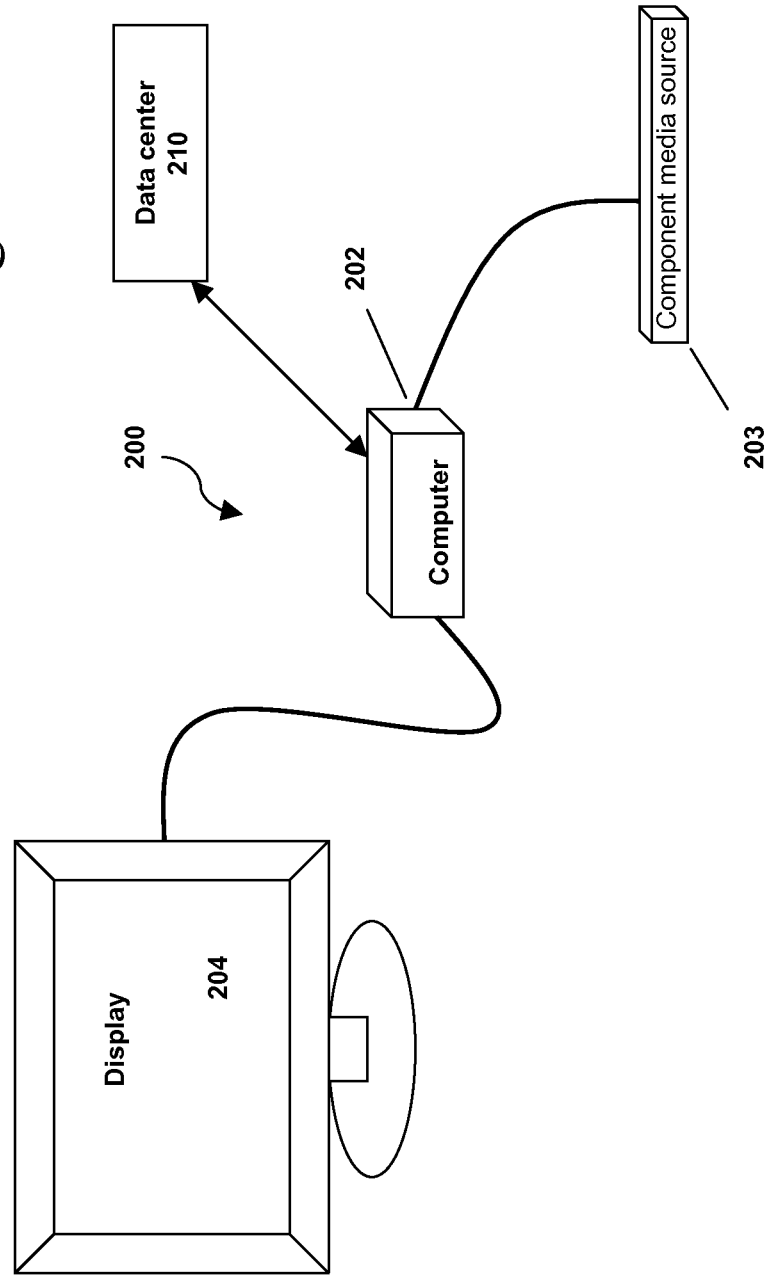
FIG. 2 illustrates a media management system.

FIG. 2 depicts a non-limiting example of a media management system 200 configured according to one embodiment. The computer system described above is for example a computer 202 of media management system 200. As shown, a component media source 203 (e.g. cable TV box, satellite receiver, etc.) is connected to the computer 202, which is in turn connected to at least one main display 204 (e.g. HDTV set, computer monitor, etc.). A user first plugs his or her existing component media source 203 into the computer 202. The component media source 203 may provide uncompressed digital data via a high definition multimedia interface (HDMI) or other digital or analog connection types. Then, the user plugs the computer 202 into the display device 204. The computer is appropriately connected (e.g. via network connection) to a remote data center (210).

The media management system enables an integrated multimedia experience by performing information capturing and identification of component source media (e.g. a television program), retrieval of related content (e.g. Internet content/web pages) and selective combined display of media from the component source 203 and related media content. Exemplary media management systems are again described in the co-pending and commonly assigned U.S. patent applications noted above.

According to one embodiment, a convertible wireless remote control is provided that allows the user to easily interface with the media management system using this convenient convertible wireless device. FIGS. 3-8 show example configurations for a convertible wireless remote device according to at least one embodiment.

Figure 3:
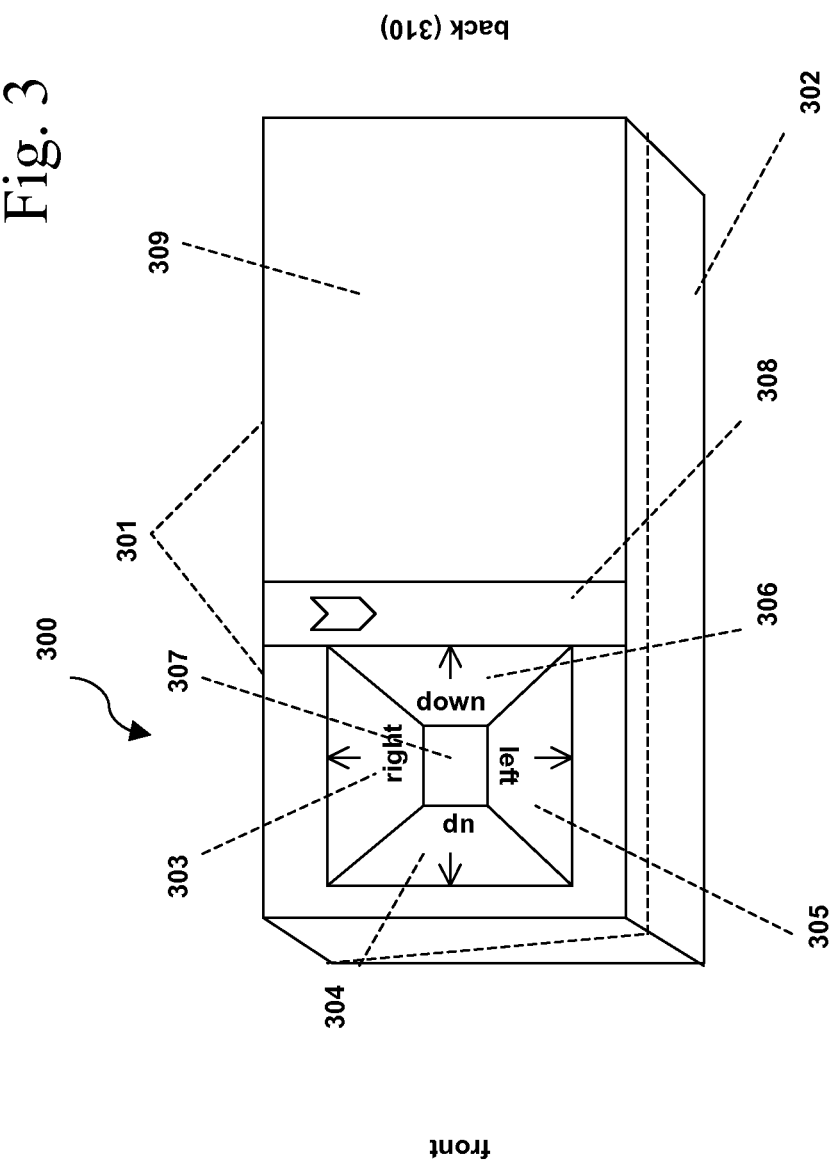
FIG. 3 illustrates a convertible wireless remote control.

FIG. 3 shows a top view of a convertible wireless remote control 300. As shown, the convertible wireless remote control 300 includes a top portion 301 and a bottom portion 302. The top portion 301 and the bottom portion 302 are selectively separable by opening the convertible wireless remote control, as further described below, and the portions are indicated as separate with dashed lines.

The top portion 301 (near the "front") contains a bank of controls (303-308) for use in the simplified mode, as described above, e.g. where a user needs only minimal control over the media management system. The controls (303-308) of the top portion 301 provide the user with a variety of controls at the "front" of the device, i.e. that portion that would normally be oriented towards the computer of the media management system during use (e.g. that portion of the convertible wireless remote control extending outward from the hand (not shown) of a user between the thumb and the first finger).

The controls at the "front" of the device preferably include an "up" button 304, a "down" button 306, a "left" button 305 and a "right" button 303. These buttons enable movement, in the respective directions, of a visible indicator (e.g. highlighted selection) upon a display 204 when the user presses the appropriate button. The bank of controls of the convertible wireless remote also preferably includes a "select" button 307 for selecting with the visible indicator (e.g. selecting a highlighted selection for execution, e.g. a link to a web site located in a queue on the side of a combined display). Situated below the buttons 303-307 (i.e. towards the "bottom" 310) is a back button 308 for undoing a previous selection (e.g. returning to the previous screen or menu on the display 204). This bank of buttons is useful for example when interfacing with the media management system in a simplified mode, such as when a cue of related web site links is provided on a side panel of the main display (204) during a television program.

Near the "back" 310 of the convertible wireless control there is preferably a convertible surface 309. The convertible surface 309 is configured for selective activation, for example when the convertible wireless device is opened by the user (as described below in connection with FIG. 6). The convertible surface 309 functions are selectively activated. It is presently preferred that the convertible surface 309 be a touch pad, such as a touch pad provided by Synaptics® Corp., which is selectively activated. Though many selective activation schemes may be employed for activating the convertible surface 309, it is presently preferred that the touch pad functionality be activated upon the user opening the convertible wireless remote control. Thus, the convertible surface will not be activated during use with the convertible wireless remote control in the simplified mode (i.e. when the convertible wireless remote control is closed). Though the touch pad functionality of the convertible surface 309 is inactive in the closed configuration, limited functionality may be enabled. For example, back-lighting and limited areas of the touch pad could be enabled in this configuration, providing one or more virtual "buttons" or lighting at particular areas of the touch pad for desired functions.

Figure 4:
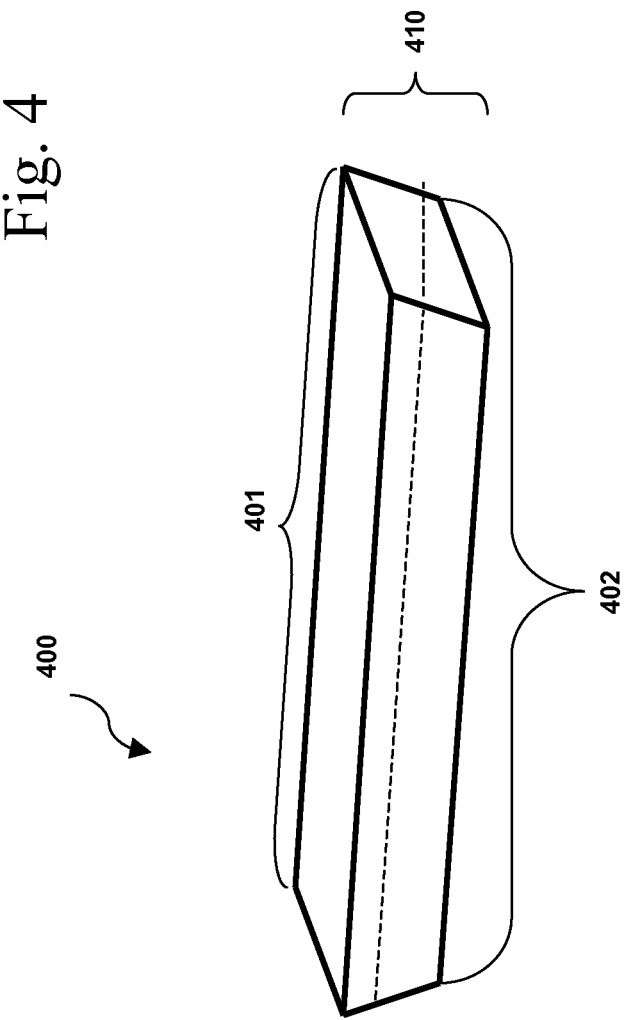
FIG. 4 illustrates a side view of a convertible wireless remote control.

FIG. 4 illustrates a side on view of the convertible wireless remote control 400 for better appreciation of the wedged shape employed. As shown, the top portion 401 and the bottom portion 402 are shaped into wedges (as indicated by the dashed lines). Thus, upon the top portion 401 and the bottom portion 402 being separated, i.e. when a user opens the device, two wedge shapes are apparent when the device is viewed from the back 410, as in FIG. 5. One wedge forms the top portion 401 and the other, symmetrical wedge forms the bottom portion 402.

Figure 5:
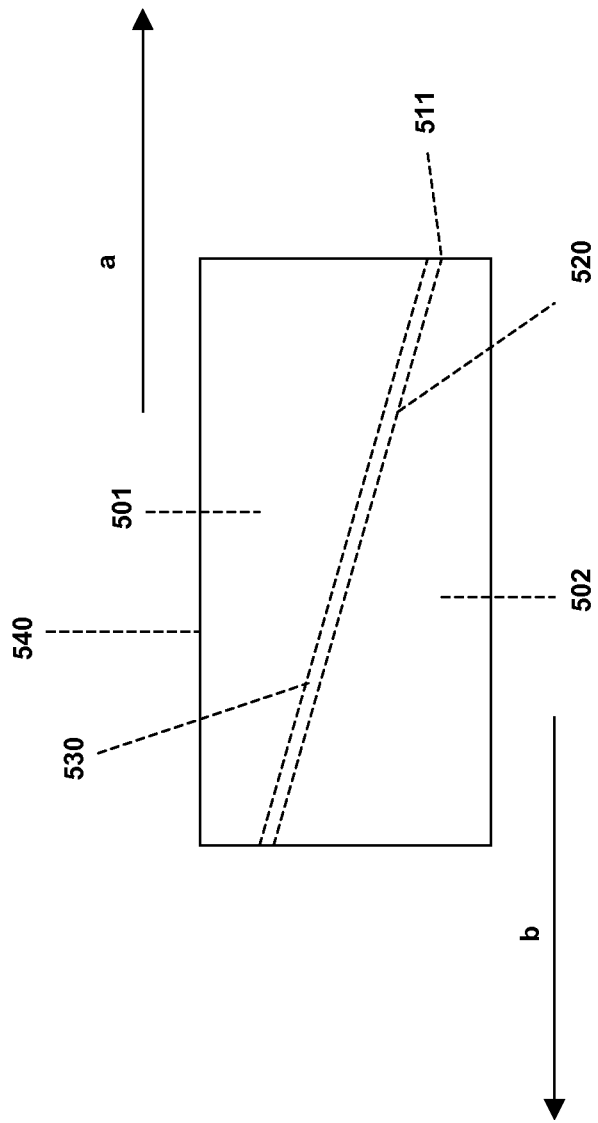
FIG. 5 illustrates an end view of a convertible wireless remote control.

As above, FIG. 5 shows a view from the "back" (e.g. 310) of the convertible wireless remote control. The top portion 501 is formed in a first wedge shape which lays on top of the symmetrical bottom portion 502, forming a second wedge shape. A top surface of the top portion is indicated at 540. A bottom surface 530 of the top portion 501 is adjacent to a top surface 520 of the bottom portion 502 in the closed position. The arrows indicate the movement (e.g. sliding) of the top portion 501 and the bottom portion 502 upon opening. Arrow "a" (to the right) indicates the movement of the top portion 501 relative to the bottom portion 502 upon user separation of the two portions. Similarly, arrow "b" (to the left) indicates the movement of the bottom portion 502 relative to the top portion 501 upon user separation of the two portions. The two portions separate only so far, as they remain connected by a connection point 511, as discussed below in connection with FIG. 6.

Figure 6:
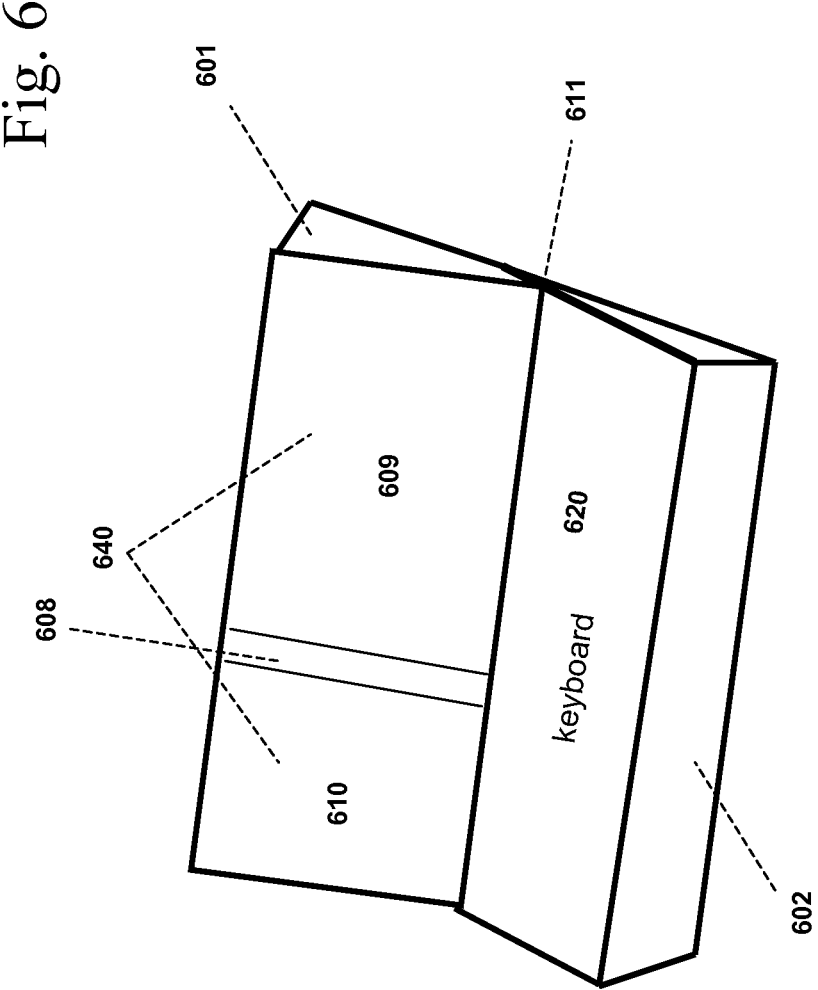
FIG. 6 illustrates an opened view of a convertible wireless remote control.

FIG. 6 illustrates a convertible wireless remote control in the opened or separated form. This opened configuration is optimal for use of the convertible wireless remote control in the "involved" mode, i.e. when the user needs further refined control over the media management system.

As shown, the top portion 601 and the bottom portion have been separated (e.g. by user opening in the directions indicated in FIG. 5). Upon opening, the wedges slide about one another, exposing the top surface 620 of the bottom portion 602. The top portion 601 and associated controls (e.g. bank of controls 610, buttons 303-308) are still accessible to the user in this configuration. Moreover, the wedges provide a user-friendly shape for further use. Because of the unique wedge shape employed for the top portion 601 and the bottom portion 602 and their relative orientation, the top surface 640 of the top portion 601 remains visible and active upon opening, thus allowing the user to employ buttons (not shown) of the control bank in this configuration. The wedge shapes also promote easier use of convertible surface 609, e.g. as a touch pad, because convertible surface lies on approximately coincident on the same plane as that of surface 620.

Moreover, as discussed above, the selectively active convertible surface 609, for example a touch pad, is activated upon opening of the convertible wireless remote control. The selective activation permits the convertible surface 609 to remain inactive when the convertible wireless remote control remains closed, yet activate (and thus provide touch pad functionality) upon opening of the convertible wireless remote control.

The involved mode is one in which the user desires to have further control over the computer of the media management system. For example, the media management system may be providing web sites related to the television program being viewed by the user, i.e. providing combined display. If the user wishes to select one of the web pages and view it, the user is enabled to utilize either the bank of controls 610 or the touch pad function of the convertible surface 609. For example, the combined display could include a queue of related web site links, e.g. displayed on a side panel of the combined display. Thus, the user could scroll through this queue and select a web site to be visited utilizing the buttons of the bank of controls 610. Alternatively, the user could move a visible cursor upon the combined display with the convertible surface 609 touch pad function and select a link to the web page.

Notably, the top surface 620 of the bottom portion includes additional buttons. Preferably this includes a full keyboard as indicated in FIG. 6, though many keypad or other user interface alternatives (e.g. other buttons, an additional touch screen or display, etc.) could be utilized. Providing the keyboard thus gives the user an option to type in phrases (e.g. for Internet queries utilizing a web browser of the media management system's computer). Accordingly, the functionality of the convertible wireless remote device is greatly expanded upon the user opening (converting) the device.

Figure 7:
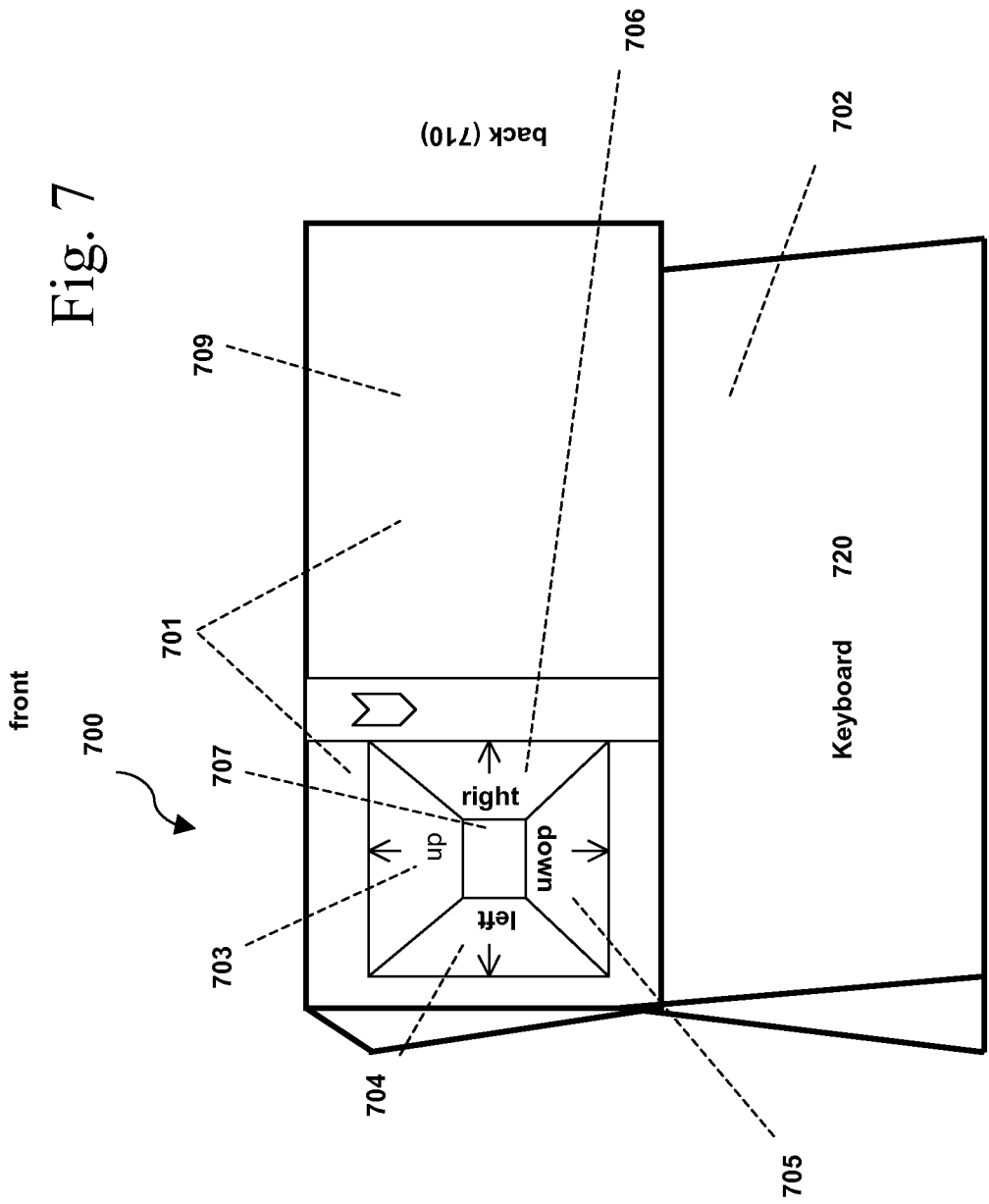
FIG. 7 illustrates an opened view of a convertible wireless remote control.

FIG. 7 illustrates a convertible wireless remote control 700 in the opened position. The reference characters in FIG. 7 correspond to those of FIG. 3 incremented by 400. Notably, the convertible wireless remote control, upon conversion (opening) can switch functionality of select controls. As already discussed, convertible surface 709 can be activated upon opening.

As another example, the bank of controls previously containing up, down, left and right buttons in certain positions (up at 304, down at 306, left at 305, and right at 303), is preferably functionally altered. Upon opening, these buttons are converted for easier use in a different holding orientation. In the open position, the convertible wireless remote control is best utilized with the keyboard (on top surface 720) of bottom portion 702 facing the user, i.e. such that the user can hold the convertible wireless remote control and type with his or her thumbs. Thus, the functionality of the buttons of the bank of controls switches to button 704 being a left button, button 706 being a right button, button 703 being an up button, and button 705 being a down button. This corresponds to the orientation shown in FIG. 7, in which the "front" of the device is now considered rotated 90 degrees from that of FIG. 3, as indicated (i.e. the "front" of the device, as held by the user, is facing the media management system). Though "up", "down", "left" and "right" are indicated on the buttons, use of arrows is preferred, as the use of the actual words may cause confusion upon conversion (i.e. these are simply included in the illustration for clarity). Again, the convertible surface 709 is activated in this orientation, preferably providing a touch pad functionality.

It should be noted that although it has been mentioned herein that the "front" of the device is facing the media management system, utilization of the appropriate communications (e.g. radio frequency) ensures that the convertible wireless remote still operates to effect the computer as described regardless of which direction the user points it.

Turning to FIG. 8, a media management system is illustrated in which the component media source, 803, the computer 802, the data center 810, and the display 804 are in operative connection, as described in connection with FIG. 2. Additionally, the convertible wireless remote control is illustrated in two conformations. In a first conformation 800*a*, the convertible wireless remote control is illustrated in the simplified mode, wherein the two wedge portions have not been separated (slid apart) by the user. In response to separation (sliding), the convertible wireless remote control takes on a second conformation 800*b*, wherein the wedge portions have been slid apart, exposing a keyboard portion, activating the touch pad portion, and changing the functionality of the control bank of buttons, as described herein.

According to an embodiment, in the response to being placed in the second conformation 800*b*, the convertible wireless remote control is configured to automatically send a signal to the computer 802 of the media management system. In response to receiving the signal at a receiver, the computer 802 of the media management system is configured to output for display a search dialogue box 804*a*. The search dialogue box 804*a* is displayed to the user, for example on the display device 804. The search dialogue box 804*a* is for example a text box of a web browser. The search dialogue box 804*a* is configured to display received inputs from the convertible wireless remote control in the second conformation 800*b* (e.g. keyboard input), such that a user can type in text to conduct an Internet search with the web browser function of the computer 802.

In brief recapitulation, at least one embodiment provides a convertible wireless remote control enabling at least two modes of operation. The two modes of operation correspond to use contexts in which the user will prefer either more or less wireless control over a computing device. Upon conversion, the convertible wireless remote control provides increased and/or altered functions.

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with an appropriate electronic device and/or the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Accordingly, elements of the present invention may be implemented on at least one electronic device running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with an electronic device perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein with reference to the accompanying drawings, it is to be understood that the embodiments are not limited to those precise descriptions, and that various other changes and modifications may be affected therein by one skilled in the art without departing from the scope or spirit of the disclosure.

What is claimed is:

1. A system comprising:
   an apparatus comprising:
   one or more processors; and
   a receiver; and
   a convertible wireless remote control configured to undergo a conformational change and automatically communicate a signal to the apparatus, wherein the conformational change comprises sliding a top portion about a bottom portion to expose a full keyboard disposed on a single internal surface of the convertible wireless remote control;
   the convertible wireless remote control including a convertible input surface in a top portion thereof that, prior to the conformational change, remains inactive and automatically activates responsive to the conformational change;
   wherein the receiver is configured to receive the signal from the convertible wireless remote control;
   wherein, responsive to execution of computer readable program code accessible to the one or more processors, the one or more processors are configured to:
   in response to receiving the signal, output for display a search dialogue box.

2. The system according to claim 1, wherein the search dialogue box comprises a text box of a web browser application.

3. The system according to claim 1, wherein the convertible input surface comprises a touch input surface.

4. A convertible wireless remote control, comprising:
   a top portion including a convertible input surface; and
   a bottom portion slidably connected to the top portion, the bottom portion comprising a full keyboard disposed on a single internal surface of the bottom portion;
   the convertible wireless remote control configured to undergo a conformational change comprising sliding a top portion about a bottom portion to expose the full keyboard of the bottom portion;
   wherein responsive to undergoing the conformational change, the convertible wireless remote control automatically communicates a signal to an apparatus, the signal triggering display of a search dialogue box;
   wherein prior to the conformational change, the convertible input surface is inactive; and
   wherein, responsive to the conformational change, the convertible wireless remote control automatically activates the convertible input surface.

5. The convertible wireless remote control according to claim 4, wherein the convertible input surface comprises a touch input surface.

* * * * *